US008874444B2

(12) United States Patent
Irmler et al.

(10) Patent No.: US 8,874,444 B2
(45) Date of Patent: Oct. 28, 2014

(54) SIMULATED CONVERSATION BY PRE-RECORDED AUDIO NAVIGATOR

(75) Inventors: Holger Irmler, Los Angeles, CA (US); Asa K. Kalama, Pasadena, CA (US); Raymond J. Scanlon, Burbank, CA (US); Brent D. Strong, Burbank, CA (US); Cory J. Rouse, Encino, CA (US); Renée M. Johnson, Van Nuys, CA (US); Andrew Stone, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 282 days.

(21) Appl. No.: 13/407,686

(22) Filed: Feb. 28, 2012

(65) Prior Publication Data
US 2013/0226588 A1 Aug. 29, 2013

(51) Int. Cl.
G10L 13/00 (2006.01)
G10L 21/00 (2013.01)
A63H 30/00 (2006.01)

(52) U.S. Cl.
CPC ............... *G10L 13/00* (2013.01); *A63H 30/00* (2013.01)
USPC ........................... 704/258; 704/270; 704/272

(58) Field of Classification Search
CPC .................................................... A63H 30/00
See application file for complete search history.

(56) References Cited

U.S. PATENT DOCUMENTS

| 5,289,273 | A  | * | 2/1994  | Lang .............................. 348/121 |
| 5,358,259 | A  | * | 10/1994 | Best ................................. 463/31 |
| 6,352,478 | B1 | * | 3/2002  | Gabai et al. ..................... 463/42 |
| 6,584,375 | B2 | * | 6/2003  | Bancroft et al. ............... 700/213 |
| 6,944,586 | B1 | * | 9/2005  | Harless et al. ................... 703/23 |
| 7,542,553 | B2 | * | 6/2009  | Gurfein et al. ............. 379/88.18 |
| 7,797,146 | B2 | * | 9/2010  | Harless et al. ................... 703/12 |
| 8,043,156 | B2 | * | 10/2011 | Ackley et al. ................... 463/23 |
| 8,060,255 | B2 | * | 11/2011 | Wieland ........................ 700/257 |
| 8,401,527 | B2 | * | 3/2013  | Weltlinger ................. 455/414.1 |
| 2003/0046181 | A1 | * | 3/2003  | Dow ............................... 705/26 |
| 2003/0140121 | A1 |   | 7/2003  | Adams |
| 2006/0149554 | A1 |   | 7/2006  | Begeja |
| 2008/0320126 | A1 | * | 12/2008 | Drucker et al. ............... 709/224 |
| 2009/0043818 | A1 |   | 2/2009  | Raichelgauz |
| 2010/0120002 | A1 | * | 5/2010  | Chang et al. .................. 434/185 |
| 2012/0204307 | A1 | * | 8/2012  | De Mattei et al. .................. 2/69 |
| 2013/0003943 | A1 | * | 1/2013  | Munns et al. .............. 379/88.01 |
| 2013/0210521 | A1 | * | 8/2013  | McMain ......................... 463/31 |

OTHER PUBLICATIONS

Kasap, et al: "Intelligent virtual humans with autonomy and personality: State-of-the-art" Intelligent Decision Technologies 1 (2007) pp. 3-15 IOS Press.
Benoit, et al: "Audio-visual and Multimodal Speech Systems" 95 Pages.

* cited by examiner

*Primary Examiner* — Brian Albertalli
(74) *Attorney, Agent, or Firm* — Farjami & Farjami LLP

(57) ABSTRACT

A method is provided for a simulated conversation by a pre-recorded audio navigator, with particular application to informational and entertainment settings. A monitor may utilize a navigation interface to select pre-recorded responses in the voice of a character represented by a performer. The pre-recorded responses may then be queued and sent to a speaker proximate to the performer. By careful organization of an audio database including audio buckets and script-based navigation with shifts for tailoring to specific guest user profiles and environmental contexts, a convincing and dynamic simulated conversation may be carried out while providing the monitor with a user-friendly navigation interface. Thus, highly specialized training is not necessary and flexible scaling to large-scale deployments is readily supported.

20 Claims, 5 Drawing Sheets

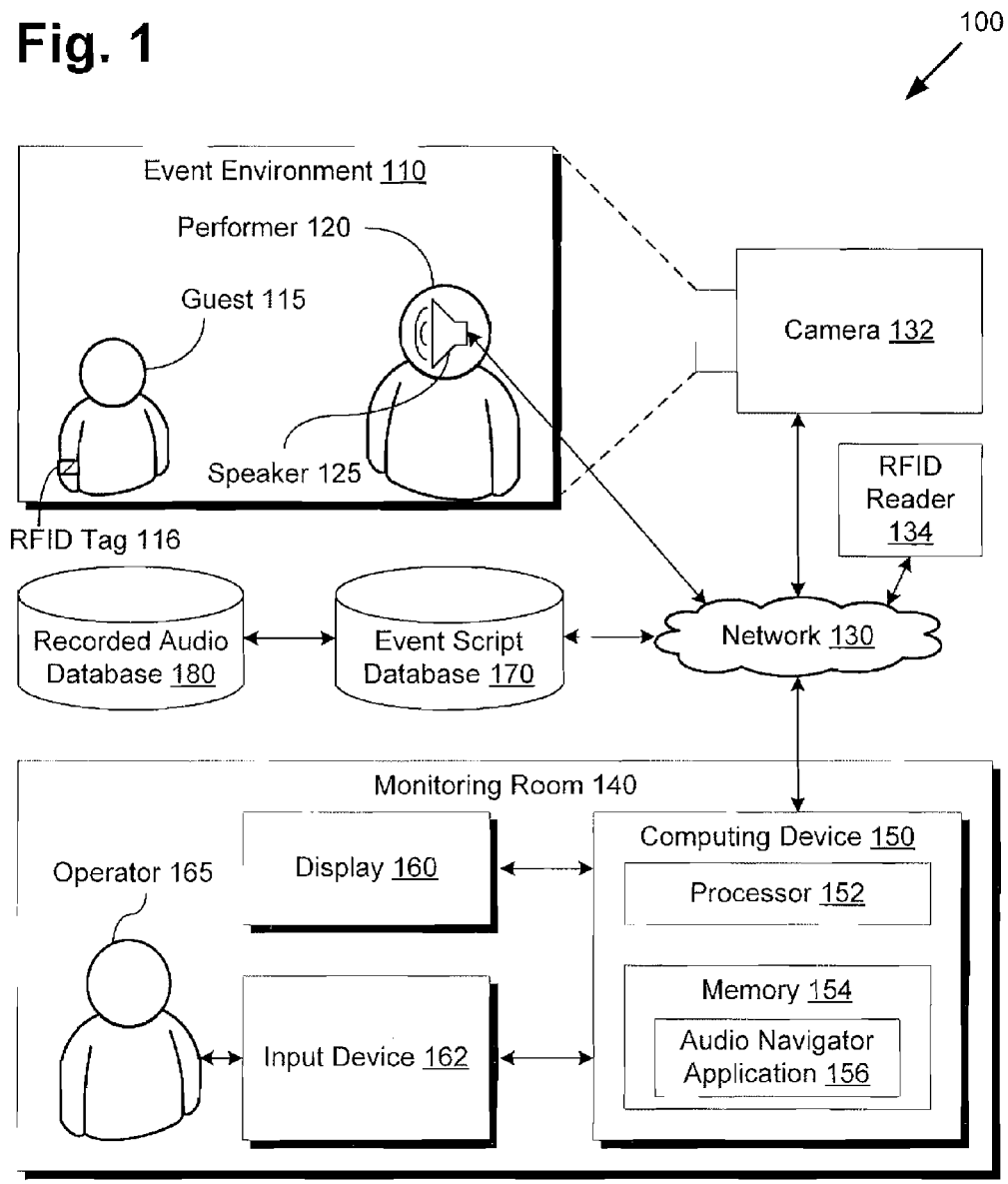

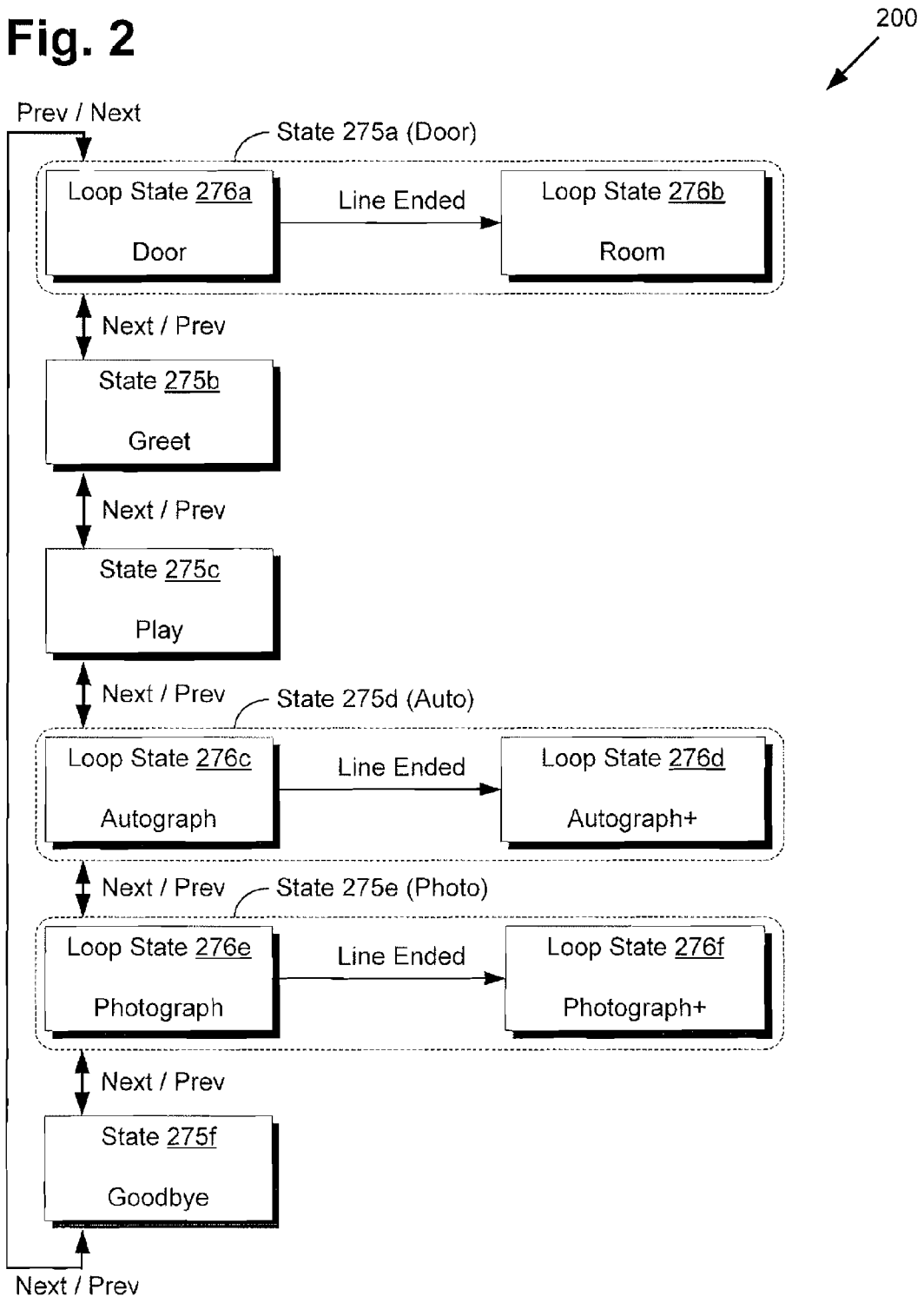

Fig. 3A

| Line | Greet Bucket | |
|---|---|---|
| 1 | Hey Pal! | I'm glad you stopped by! |
| 2 | Hello there! | It sure is nice to meet ya! |
| 3 | Hiya! | Oh boy! Am I glad you stopped by! |
| 4 | Hi there! | I'm so excited to see you! |
| Beat | 1 | 2 |

Table 385a

| Line | Play Bucket |
|---|---|
| 1 | Are you having fun today? |
| 2 | So what brings you here today? |
| 3 | What do you think of my shirt? |
| Beat | 1 |

Table 385b

| Line | Autograph Bucket | | |
|---|---|---|---|
| 1 | Oh, an autograph. I'd be happy to sign it. | (spells name) | There ya go. |
| 2 | I bet you'd like an autograph? You got it! | (hums) | Here ya go. |
| 3 | Oh, an autograph. I'd be happy to sign it. | (spells another name) | Just kidding. A-hyuck! |
| Beat | 1 | 2 | 3 |

Table 385c

| Line | Autograph+ Bucket | | |
|---|---|---|---|
| 1 | Another autograph? Hmm... What should I write this time? | (spells name) | Here you go, pal. |
| 2 | One more? Sure! | (la-las) | Thanks, pal! |
| 3 | Hey, another one! | This is a great way to practice my penmanship! | There ya go. |
| Beat | 1 | 2 | 3 |

Table 385d

Fig. 3B

| Line | Greet (Birthday Shift) Bucket | |
|---|---|---|
| 1 | Hey Pal! | Happy Birthday to you! |
| 2 | Hello there! | Let's have the best birthday ever! |
| 3 | Hiya! | I have a special present for your birthday! |
| 4 | Hi there! | Let's celebrate your birthday! |
| Beat | 1 | 2 |

Table 385e

| Line | General-Purpose (Laughter) Bucket |
|---|---|
| 1 | (ha-ha) |
| 2 | (ha-ha!) Aww... |
| 3 | (giggle) |
| Beat | 1 |

Table 385f

| Line | Autograph (Birthday Shift) Bucket | | |
|---|---|---|---|
| 1 | An autograph? Sure, it's your birthday after all! | (spells name) | Here you go, pal. |
| 2 | How about a birthday autograph? | (la-las) | Thanks, pal! |
| Beat | 1 | 2 | 3 |

Table 385g

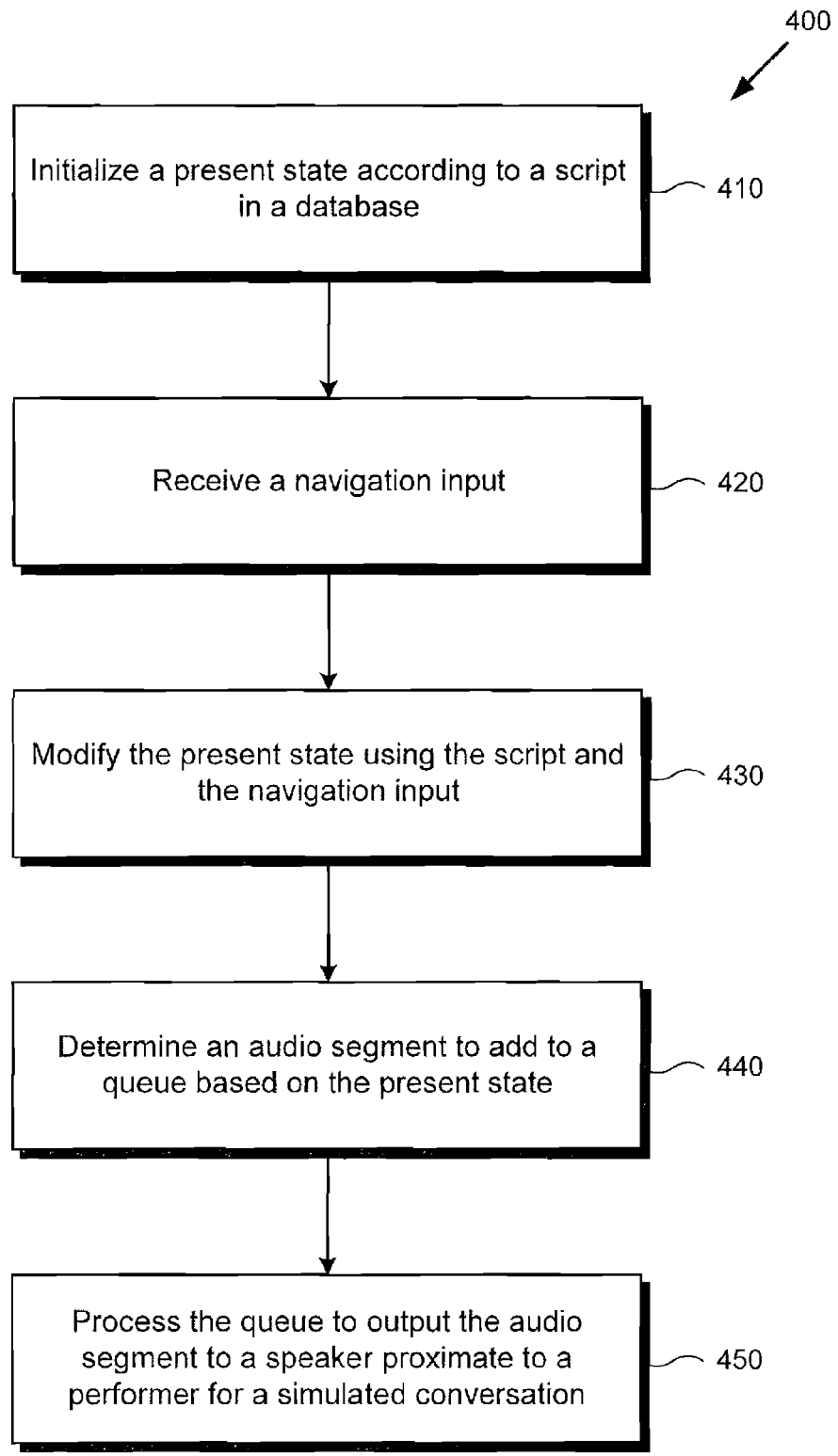

SIMULATED CONVERSATION BY PRE-RECORDED AUDIO NAVIGATOR

BACKGROUND

Simulated conversations can provide an interactive experience with a specific character, personality, actor, historical figure or other person, whether real or fictional. These interactive experiences may be particularly applicable for various entertainment and informational settings. For example, simulated conversations may be utilized in a theme park setting to enable interactions and real-time conversations with costumed performers. The opportunity for guests to meet and chat with their favorite animated characters in real life may provide a considerable incentive for repeated visits to the theme park.

In some cases, it may be appropriate to use a voice-alike talent that can convincingly emulate the voice of the character. However, this approach may be difficult to scale up for large-scale deployments. The costs of securing and training suitable talent may be very high. Furthermore, voice performance authorizations for the desired character may be unavailable due to contracts or other circumstances.

One solution for providing simulated conversations is to utilize a voice soundboard, where a number of pre-recorded phrases are mapped to individual selections. However, to provide a convincing and natural result, a very large number of phrases need to be mapped, quickly rendering the simple soundboard approach impractical. Another solution is to utilize speech synthesis, which can provide for an unlimited number of arbitrary phrases. However, the present state of speech synthesis technology is still inadequate for providing a convincing and natural sounding voice performance.

SUMMARY

The present disclosure is directed to a simulated conversation by a pre-recorded audio navigator, substantially as shown in and/or described in connection with at least one of the figures, as set forth more completely in the claims.

BRIEF DESCRIPTION OF THE DRAWINGS

FIG. 1 presents an exemplary diagram of a system for providing a simulated conversation by a pre-recorded audio navigator;

FIG. 2 presents an exemplary diagram of a script for providing a simulated conversation by a pre-recorded audio navigator;

FIG. 3A presents an exemplary diagram of state based audio buckets for providing a simulated conversation by a pre-recorded audio navigator;

FIG. 3B presents an exemplary diagram of state shifted and general-purpose audio buckets for providing a simulated conversation by a pre-recorded audio navigator;

FIG. 4 presents an exemplary flowchart illustrating a method by which a simulated conversation may be provided by a pre-recorded audio navigator.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents an exemplary diagram of a system for providing a simulated conversation by a pre-recorded audio navigator. Diagram 100 of FIG. 1 includes event environment 110, network 130, camera 132, radio frequency identifier (RFID) reader 134, monitoring room 140, event script database 170, and recorded audio database 180. Event environment 110 includes guest 115, RFID tag 116, performer 120 and speaker 125. Monitoring room 140 includes computing device 150, display 160, input device 162, and operator 165. Computing device 150 includes processor 152 and memory 154. Memory 154 includes audio navigator application 156.

Event environment 110 may be any indoor or outdoor environment where a simulated conversation is to take place. For example, event environment 110 may represent a meet-and-greet room in a theme park. In some implementations, performer 120 may be a person in costume as a real world representation of an animated or virtual character. In other implementations, performer 120 might be a remotely controlled robot. In either case, performer 120 may simulate a conversation with guest 115 by outputting recorded speech phrases through speaker 125, which is proximate to performer 120 and may be hidden in a head area of a costume, suit, or robot body. The recorded speech phrases are selected to respond to the context of event environment 110 and the behavior and characteristics of guest 115. For simplicity, only a single guest 115 and a single performer 120 are shown in a single event environment 110 for carrying out a simulated conversation in diagram 100 of FIG. 1. However, alternative implementations may support multiple environments, multiple performers, and multiple guests or groups of guests.

To assist performer 120, a separate operator 165 may monitor event environment 110 and select appropriate recorded speech phrases to output to speaker 125. To maintain simplicity, only a single operator 165 is shown in diagram 100 of FIG. 1, although alternative implementations may support multiple operators. In yet other implementations, performer 120 may partially or wholly perform the duties of operator 165. Thus, the equipment in monitoring room 140 may be repositioned within event environment 110, for example within a large costume of performer 120 for direct manipulation by performer 120. In this case, a separate operator 165 may not be necessary.

Performer 120 may also be provided with movement and animation cues to supplement the audio cues discussed above. For example, lips may be synchronized with the audio of speaker 125, eyes may follow the position of guest 115, and other facial cues may be provided. Performer 120 may also gesture, wave, move, dance, shake hands, hug, and perform other body motions and interactions. As with the selection of audio cues, the performance of animation and movements may be carried out directly by performer 120 or remotely queued by operator 165.

Audio navigator application 156 within memory 154 executing on processor 152 may provide operator 165 with a live audiovisual feed of event environment 110 on display 160 so that operator 165 can monitor guest 115 to select appropriate audio responses, animations, and movements using input device 162. For example, camera 132 may record an audio-video stream of event environment 110, which is then transmitted in a wired and/or wireless fashion through network 130. Computing device 150 may be any type of computing device including a desktop workstation, a laptop, a tablet, a mobile phone, or another device. Computing device 150 receives the audio-video stream from network 130 for outputting to display 160, which may also include built-in speakers.

Thus, based on the behavior and spoken words of guest 115 as perceived on display 160, operator 165 may select an appropriate audio response from recorded audio database 180 with the assistance of audio navigator application 156 following a script from event script database 170. Optionally, audio navigator application 156 may also allow operator 165 to specify animations and movements for performer 120, as described above. Event script database 170 may include a script that dictates the overall flow of a conversation, providing operator 165 with an easily followed template for steering the simulated conversation. Recorded audio database 180 may include a large number of pre-recorded speech phrases in the voice of the character represented by performer 120. For example, if performer 120 is wearing a costume for an animated character, then recorded audio database 180 may include a large number of speech clips spoken in the voice of the animated character. The speech clips may be extracted from existing source material or newly recorded by authorized voice talent for the animated character. After operator 165 selects an audio response, the audio response may then be added to a queue for transmitting through speaker 125 via network 130.

Additional contextual information may also be utilized by audio navigator application 156 to assist operator 165 in choosing the most relevant responses. For example, guest 115 may be wearing a theme park identification bracelet that includes an embedded RFID tag 116. RFID tag 116 may include, for example, a unique identifier referencing records in a user database containing user profile information such as birthday, hometown, prior park history, family and friends, likes and dislikes, and other data. RFID reader 134 may then read the unique identifier in RFID tag 116 for transferring to computing device 150 over network 130. Computing device 150 may then retrieve the user profile information from the user database, for example over network 130. Audio navigator application 156 may then utilize the user profile information for assisting operator 165 in targeting and customizing the simulated conversation to feel more personal and special for guest 115. While RFID is one exemplary method of retrieving user profile information, other methods of inferring user profile information may be utilized, for example facial recognition or other biometric analysis.

In this manner, awkward synthesized speech and logistically cumbersome voice-alike talent may be advantageously avoided by utilizing only authentic and authorized character voices, which may be stored as audio segments within recorded audio database 180. While recorded audio database 180 may contain a large number of spoken phrases to enable natural sounding and varied conversations, audio navigator application 156 may provide contextual intelligence to narrow the range of choices to a simple and manageable script based navigation interface. As a result, operator 165 is enabled to easily select most relevant phrases which may be further tailored, both manually and automatically, to the context of event environment 110 and to the spoken words, profile data, and other information of guest 115.

Moving to FIG. 2, FIG. 2 presents an exemplary diagram of a script for providing a simulated conversation by a pre-recorded audio navigator. Script diagram 200 of FIG. 2 includes state 275a, 275b, 275c, 275d, 275e, and 275f. State 275a includes loop state 276a and 276b. State 275d includes loop state 276c and 276d. State 275e includes loop state 276e and 276f.

Event script database 170 of FIG. 1 may contain a script corresponding to script diagram 200 of FIG. 2, which may be directed towards a typical indoor meet-and-greet scenario within event environment 110. However, other scenarios and interactions may be supported other than the meet-and-greet scenario shown in the Figures. After the script is loaded by computing device 150, the script variables may be initialized and the default initial state may be set to state 275a, labeled "Door". Operator 165 may move to various different states by selecting "Next" or "Prev" via input device 162, as indicated by "Next/Prev".

As shown in FIG. 2, some states may include multiple sub-states or "loop states". Thus, an initial line of dialogue within state 275a may correspond to loop state 276a, and successive lines of dialogue within state 275a may correspond to loop state 276b, as indicated by "line ended". In the case of backtracking through script diagram 200, each state having multiple loop states may remember the appropriate loop state to return to. In this manner, more natural sounding conversations may be supported to acknowledge that prior conversation loops may have already occurred. For example, with regard to loop state 276a and 276b, loop state 276a or "Door" may correspond to an invitation just outside the entrance door of event environment 110, for example "Welcome, please come inside", whereas loop state 276b or "Room" may correspond to an invitation to sit within the room of event environment 110, for example "Please sit and make yourself comfortable".

Thus, operator 165 may proceed from top to bottom of script diagram 200, backtracking as necessary if deviations from the script are demanded by the circumstances. Thus, state 275a or "Door" may begin as the present state, associated with phrases relating to the welcoming of guests from outside, such as guest 115, to the inside of event environment 110. As a new present state is reached, the associated phrases may be automatically added to a queue. Alternatively, operator 165 may manually add the phrases of the present state to the queue. State 275b or "Greet" may relate to greeting guest 115 and making context sensitive remarks including commenting about birthdays, any themed apparel the guest may be wearing, local events, holidays, time, date, weather, and other topics. State 275c or "Play" may relate to playful conversation and pleasantries. State 275d or "Auto" may relate to the signing of an autograph for guest 115, with loop state 276c or "Autograph" corresponding to a first autograph and loop state 276d or "Autograph+" corresponding to successive autographs. Similarly, state 275e or "Photo" may relate to taking a photograph with guest 115, with loop state 276e or "Photograph" corresponding to a first photograph and loop state 276f or "Photograph+" corresponding to successive photographs. State 275f may relate to goodbyes and farewells.

As shown in FIG. 2, script diagram 200 provides a generally linear script in which a conversation may be envisioned to proceed. However, some events may occur out of order from the envisioned script. For example, guest 115 might request a photograph first before an autograph. In this case, input device 162 may provide a means of jumping directly to a desired state.

For example, if input device 162 is implemented using a joystick, specific states may be mapped to specific buttons on the joystick, with "Prev" and "Next" mapped to arrows, directions, or triggers on the joystick. Display 160 may then inform operator 165 of the current state and provide a preview for the next few "Prev" and "Next" states. Thus, in some implementations, operator 165 may select the "Next" or "Prev" navigation choice multiple times quickly in succession to skip to a desired state. Automatic queuing of phrases from skipped states may be disabled when such a rapid succession of "Next" or "Prev" navigation choices are detected.

In other implementations, input device 162 may be a mouse, a touchscreen, or another pointing device, in which case operator 165 may directly select a desired state from a graphical user interface (GUI) presented on display 160. In yet other implementations, input device 162 may be a microphone or camera, in which case voice commands or gestures may be utilized to trigger the appropriate state transitions in script diagram 200. In further implementations, multiple input devices may be supported to provide control flexibility for operator 165.

After state 275f, the "Next" script transition may return back to state 275a, and a "show reset" may be issued to reset all states back to initial loop states. In some cases, a "soft reset" may be issued that retains the loop state of selected states, rather than resetting all states. For example, if no new guests are being ushered into the room, state 275a may remain at loop state 276b, rather than being reset to loop state 276a. A soft reset may thus be triggered between each guest or each group of guests, so that the meet-and-greet script is properly recalibrated to service each new guest or new group of guests.

Next, FIG. 3A presents an exemplary diagram of state based audio buckets for providing a simulated conversation by a pre-recorded audio navigator. FIG. 3A includes table 385a, 385b, 385c, and 385d. With respect to FIGS. 3A and 2, table 385a or "Greet Bucket" may correspond to phrases associated with state 275b, table 385b or "Play Bucket" may correspond to phrases associated with state 275c, table 385c or "Autograph Bucket" may correspond to phrases associated with loop state 276c, and table 385d or "Autograph+Bucket" may correspond to phrases associated with loop state 276d. Tables 385a through 385d may be stored in event script database 170 of FIG. 1 and may reference audio segments stored within recorded audio database 180 of FIG. 1. For simplicity, the tables shown in FIG. 3A may only represent an exemplary subset of buckets available for script diagram 200 of FIG. 2.

Looking at table 385a, it can be observed that each "bucket" references a plurality of spoken phrases within recorded audio database 180, which are organized by "line" and "beat". Each line represents a variation of a conversation theme represented by the particular bucket, or in this case "Greet". A line may be selected from a bucket in cyclical fashion, for example line 1 first, then line 2, then line 3, then line 4, then back to line 1. Thus, each bucket may remember its present selected line, incrementing the line to be selected after a line is queued from the bucket, and returning back to line 1 after the last line is queued. In other implementations, lines may be randomly chosen or manually selected by operator 165. However, to simplify the user interface presented to operator 165, it may be preferable to adopt the cyclical line selection as discussed above. Buckets may have any number of lines to provide several variations of the same conversation pattern, thereby avoiding unnatural sounding and monotonous script repetitions.

Each line may further be divided into any number of beats, which may be individually queued to provide natural pauses in the conversation. The pauses may, for example, allow guest 115 to verbally respond, or allow performer 120 to perform other actions such as shaking hands, posing, or signing. Once all the beats of a particular line are queued and output, the present state may transition to a next loop state, if available.

For example, observing table 385c and 385d and state 275d of FIG. 2, one can observe that for a first loop, or when an autograph may be first requested from guest 115, the autograph bucket from table 385c is used in loop state 276c. Thus, for example, line 1 of table 385c may be selected, added to the queue, and output to speaker 125. Afterwards, since an additional loop state is available, state 275d transitions from loop state 276c to loop state 276d. If guest 115 wants another autograph on a different item, then audio from state 275d may be queued again, resulting in autograph+bucket from table 385d being used. Thus, for example, line 1 of table 385d may be selected, added to the queue, and output to speaker 125. If guest 115 requests a third autograph, then line 2 of table 385d may be selected, added to the queue, and output to speaker 125. As shown by the phrases in table 385d, the selectable conversation phrases now acknowledge that an autograph was already previously provided in the language "Another autograph" or "One more" or "another one", providing a more contextually relevant and believable simulated conversation.

FIG. 3B presents an exemplary diagram of shifted and general-purpose audio buckets for providing a simulated conversation by a pre-recorded audio navigator. With respect to FIGS. 3B and 2, table 385e or "Greet (Birthday Shift) Bucket" may correspond to phrases associated with state 275b, and table 385g or "Autograph (Birthday Shift) Bucket" may correspond to phrases associated with state 275d. Tables 385e, 385f, and 385g may be stored in event script database 170 of FIG. 1 and may reference audio segments stored within recorded audio database 180 of FIG. 1. For simplicity, the tables shown in FIG. 3B may only represent an exemplary subset of buckets available for script diagram 200 of FIG. 2.

As previously described, information concerning the context of event environment 110 and guest 115 may be utilized to tailor and target the simulated conversation. These tailored conversations may be referred to as "shifts", where the states and corresponding buckets may be "shifted" from a general or neutral scenario to one that is customized for guest 115. For example, if the birthday of guest 115 is stored as user profile information referenced by RFID tag 116, then audio navigator application 156 may automatically trigger a navigation input shifting any relevant states to a corresponding "Birthday Shift" version if today matches or is close to the birthday of guest 115. In some implementations, specific lines or buckets may have various associated meta tags, and transitions to shift states may be determined based on the meta tags of the present line or bucket and/or the meta tags of a shifted line or bucket to be selected next.

Shifts may also be manually triggered, for example if guest 115 is not wearing RFID tag 116 but nevertheless volunteers during the conversation that today is his birthday. Operator 165 may then react to this new information by manually triggering a "Birthday Shift". Thus, looking at FIG. 2, state 275b may be transitioned to a "Greet (Birthday Shift)" state associated with table 385e, and state 275d may be transitioned to a "Autograph (Birthday Shift)" state associated with table 385g. Note that shifted states may also contain more or less loops than the corresponding general or neutral state.

As shown in table 385e and 385g, the selectable phrases may now incorporate comments acknowledging the birthday of guest 115. Accordingly, a more natural and personalized conversation can be provided that is tailored to each individual guest. As previously discussed, besides birthdays, various variables may be taken into consideration by audio navigator application 156 including hometown, prior park history, family and friends, likes and dislikes, themed apparel the guest may be wearing, local events, holidays, time of day such as morning, afternoon, or evening, date including the day of week, weather, and other data and topics.

Furthermore, it may be desirable to allow certain phrases, for example common phrases such as greetings, responses, laughter, and others into general-purpose buckets that may be triggered from any script state. Thus, the phrases in table 385*f* or "General-Purpose (Laughter) Bucket" may be triggered from any of the states in FIG. 2, for example by a dedicated joystick button cycling through general-purpose buckets, a dedicated user interface element on display 160, or by another approach.

FIG. 4 presents an exemplary flowchart illustrating a method by which a simulated conversation may be provided by a pre-recorded audio navigator. Flowchart 400 begins when processor 152 executes audio navigator application 156 to initialize a present state according to a script in event script database 170 (410). For example, a script corresponding to script diagram 200 of FIG. 2 may be initialized, setting all loops, lines, and beats to initial values and the present state to state 275*a*. Next, processor 152 receives a navigation input (420). For example, operator 165 may utilize input device 162 to select a navigation command, such as "Next" or "Prey". For the purposes of flowchart 400, assume that "Next" is selected. Continuing, processor 152 modifies the present state using the script and the navigation input (430). Accordingly, the present state may be transitioned to the next state, or state 275*b*, as indicated by script diagram 200 of FIG. 2. At state 275*b*, processor 152 may determine an audio segment to add to a queue based on the present state (440). Since state 275*b* is associated with table 385*a* of FIG. 3A, and since the script has been initialized to default values, the audio segment referenced by line 1, beat 1 of table 385*a* is queued for output through speaker 125. Processor 152 may then process the queue to output the audio segments referenced by table 385*a* in recorded audio database 180 to speaker 125, which is proximate to performer 120 (450). Accordingly, a simulated conversation is provided, and flowchart 400 may repeat 420, 430, 440, and 450 as necessary to continue the conversation.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A computing device for providing a simulated conversation with a guest using a pre-recorded audio, the computing device comprising:
a processor configured to:
    initialize a present state according to a script in a database;
    receive a navigation input from an operator monitoring the guest, where the navigation input is in response to an action by the guest;
    modify the present state using the script and the navigation input;
    determine an audio segment of the pre-recorded audio to add to a queue based on the present state;
    process the queue to output the audio segment to a speaker proximate to a performer for the simulated conversation.

2. The computing device of claim 1, wherein the navigation input is received in response to an audiovisual monitoring of the guest.

3. The computing device of claim 1, wherein the navigation input is received by a selection from a joystick or a user interface on a display.

4. The computing device of claim 1, wherein the navigation input comprises a movement to a next or previous state of the script.

5. The computing device of claim 1, wherein the navigation input comprises a shift of the script based on a user profile information of the guest.

6. The computing device of claim 5, wherein the user profile information is referenced from a RFID tag of the guest.

7. The computing device of claim 1, wherein the navigation input comprises a shift of the script based an event environment where the simulated conversation takes place.

8. The computing device of claim 1, wherein the audio segment is referenced from an audio bucket containing a plurality of lines each representing a variation of a conversation theme.

9. The computing device of claim 1, wherein the present state includes a present loop state for the determining of the audio segment.

10. A method for providing a simulated conversation with a guest using a pre-recorded audio, the method comprising:
    initializing a present state according to a script in a database;
    receiving a navigation input from an operator monitoring the guest, where the navigation input is in response to an action by the guest;
    modifying the present state using the script and the navigation input;
    determining an audio segment of the pre-recorded audio to add to a queue based on the present state;
    processing the queue to output the audio segment to a speaker for the simulated conversation.

11. The method of claim 10, wherein the navigation input is received in response to an audiovisual monitoring of the guest.

12. The method of claim 10, wherein the navigation input is received by a selection from a joystick or a user interface on a display.

13. The method of claim 10, wherein the navigation input comprises a movement to a next or previous state of the script.

14. The method of claim 10, wherein the navigation input comprises a shift of the script.

15. The method of claim 10, wherein the audio segment is referenced from an audio bucket containing a plurality of lines each representing a variation of a conversation theme.

16. The method of claim 10, wherein the present state includes a present loop state for the determining of the audio segment.

17. A system for providing a simulated conversation with a guest using a pre-recorded audio, the system comprising:
    a speaker proximate to a performer;
    a computing device comprising a processor configured to:
        initialize a present state according to a script in a database;
        receive a navigation input from an operator monitoring the guest where the navigation input is in response to an action by the guest;

modify the present state using the script and the navigation input;

determine an audio segment of the pre-recorded audio to add to a queue based on the present state;

process the queue to output the audio segment to the speaker for the simulated conversation.

18. The system of claim 17, further comprising a camera, wherein the navigation input is received in response to an audiovisual monitoring of the guest using the camera.

19. The system of claim 17, wherein the navigation input comprises a shift of the script based on a user profile information of the guest.

20. The system of claim 17, further comprising a joystick input device, wherein the navigation input is received from the joystick input device.

* * * * *